July 11, 1961

E. E. FOREMAN ET AL 2,991,777

FUEL ECONOMIZER FOR PISTON ENGINE CARBURETORS

Filed May 17, 1960

INVENTORS
Ernest E. Foreman
Irving H. Mattinson

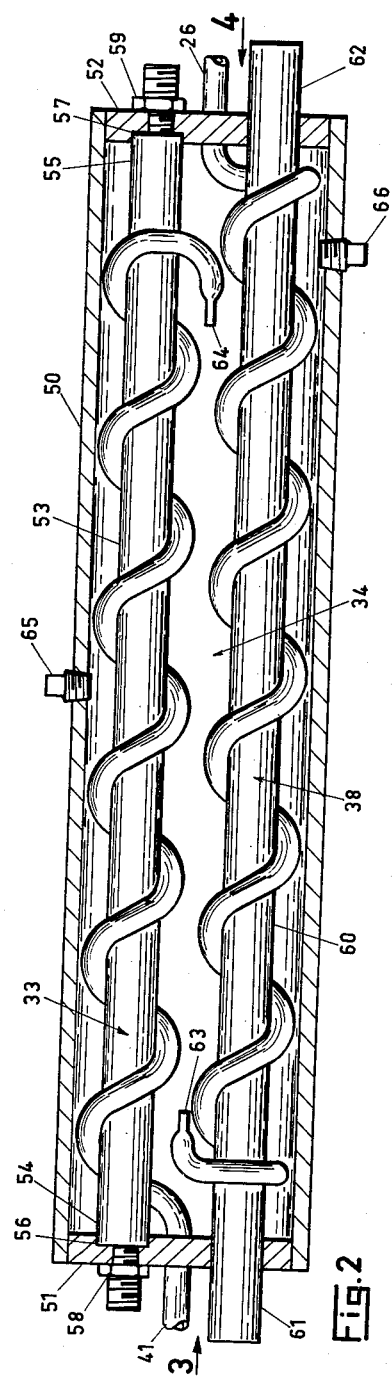
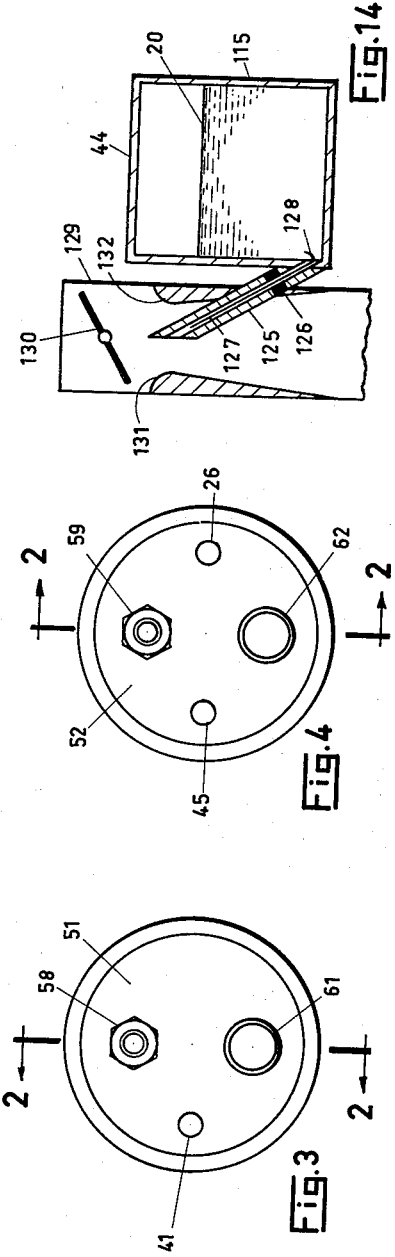

July 11, 1961        E. E. FOREMAN ET AL        2,991,777

FUEL ECONOMIZER FOR PISTON ENGINE CARBURETORS

Filed May 17, 1960        5 Sheets-Sheet 3

INVENTORS
Ernest E. Foreman
Irving J. Mattinson

July 11, 1961  E. E. FOREMAN ET AL  2,991,777
FUEL ECONOMIZER FOR PISTON ENGINE CARBURETORS
Filed May 17, 1960                              5 Sheets-Sheet 4

INVENTORS
Ernest E. Foreman
Irving P. Mattinson

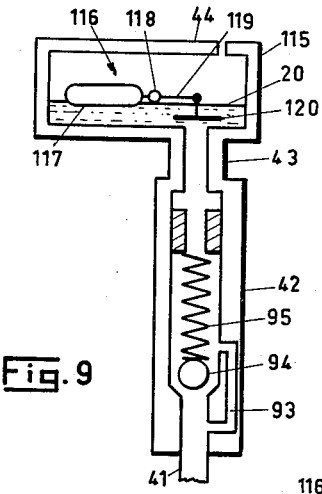
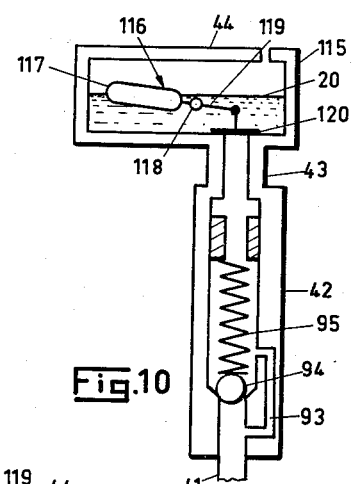
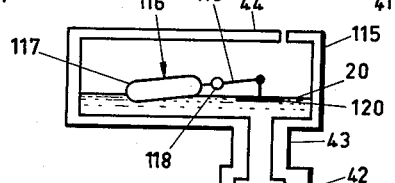
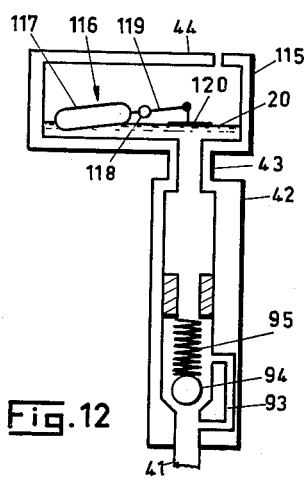
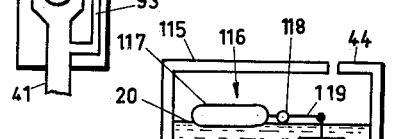

United States Patent Office 2,991,777
Patented July 11, 1961

2,991,777
FUEL ECONOMIZER FOR PISTON ENGINE CARBURETORS
Ernest Edward Foreman and Irving Frederick Mattinson, Hamilton, Ontario, Canada. (% Canadian Research and Development Foundation, 1434 Queen St. W., Toronto 3, Ontario, Canada)
Filed May 17, 1960, Ser. No. 30,054
9 Claims. (Cl. 123—122)

This invention relates to improvements in internal combustion engines and more particularly to improvements in accessories to conventional internal combustion engines, adapted to provide increased fuel economy and improved engine performance.

It is well known that performance of internal combustion engines such as are commonly used in automotive vehicles and the like, is decreased during low temperature operation, mainly due to inadequate atomizing of cold liquid fuel in the carburetor system thereof.

Various systems and apparatus have been devised, adapted to pre-heat the liquid fuel before admitting access thereof to the carburetor system of the engine, such methods hitherto having suffered from a variety of disadvantages consisting for instance of incorporation of comparatively large and space consuming heat exchanger systems, sometimes utilized in conjunction with condenser systems, making such apparatus unsuitable to be applied within the limited space, under the hood of a conventional automotive engine.

Other systems have utilized apparatus adapted to vaporize liquid fuel prior to such fuel entering a carburetor system, this having the disadvantage that accurate metering of fuel gas to the inlet ports of the engine is made extremely difficult, not to say impossible.

Some systems utilize heat from the exhaust gases in a heat exchanger system, such systems being difficult to control thermally and having the further disadvantage that lethal exhaust gases have to be circulated through ducts and pipes, extending the normal risk of leakage of carbon monoxide into interior of the car to a further degree than is normal in conventional automobiles.

Other systems have utilized electric heating elements to pre-heat the liquid fuel on its way to the carburetor system, this method involving a considerable drain on the battery power, making it necessary to utilize a larger battery than normal.

Some systems have a pressure build up due to expansion as temperature of fuel is raised, such pressure build up placing an extra stress on the carburetor system and requiring change of needle valve in float chamber, making it difficult to control fuel level in float chamber through the varying pressures in the heat exchanger systems.

Other systems have utilized coolant water to raise the temperature of the fuel in a heat exchanger, such systems however being limited to the maximum temperature of the coolant water, such systems furthermore being subject to considerable fluctuation in temperature due to varying temperature of the coolant water depending on momentary weather conditions etc.

Still other methods have utilized carburation and other accessories of completely different type compared with those utilized in conventional automobiles, making such systems unsuitable for application to present day conventional engines, the cost of incorporating such systems in a conventional engine thereby being made very excessive.

It is an object of this invention to provide a fuel economizer system for conventional combustion engines, in the following called, "Fuel economizer" that is extremely small in volume, adapting such fuel economizer to be easily installed within the space available beneath the engine hood of a conventional automobile.

It is another object of this invention to provide a fuel economizer adapted to heat up conventional liquid fuel to a heat exchanger exit temperature which is substantially in the vicinity of, yet below vaporising temperatures, thereby maintaining fuel in a liquid condition at the entrance to the carburetor, and maintaining metering properties of the fuel within a fluid range.

It is another object of this invention to provide a fuel economizer incorporating a heat exchanging system adapted to utilize waste heat from coolant water and engine oil to heat up liquid fuel.

It is a further object of this invention to provide a fuel economizer adapted to provide and maintain a pressure within the fuel at the inlet port to the carburetor system, that at all times will be of a size sufficient to maintain a substantially constant fuel level within the float chamber, independent of speed of fuel drain.

It is another object of this invention to provide a fuel economizer of extremely simple construction that may be attached to an existing engine by any auto mechanic skilled in the trade.

It is another object of this invention to provide a fuel economizer that is adapted to permit relief of excessive fuel pressure in the heat exchanger, excessive fuel being, through relief valve means, permitted to flow back to the fuel tank.

These and other objects and features of this invention will become apparent when taken in conjunction with the following drawings in which:

FIG. 2 is a sectional side elevation of the heat exchanger unit portion of a fuel economizer embodying this invention.

FIG. 3 is an end view of the heat exchanger unit shown in FIG. 2 as viewed in the direction of arrow 3.

FIG. 4 is an end view of the heat exchanger unit shown in FIG. 2 as viewed in the direction of arrow 4.

FIG. 9 is a diagrammatic view of a carburetor metering valve embodied in this invention illustrating the operation, while the engine is running at constant speed, of the metering valve and relative operation of the float valve of the carburetor of a conventional engine on which the present invention is mounted.

FIG. 10 is a diagrammatic view of a carburetor metering valve embodied in this invention illustrating the operation upon the engine being closed down quickly from high speed to idle.

FIG. 11 is a diagrammatic view of a carburetor metering valve embodied in this invention illustrating the operation while the engine is running at its maximum speed.

FIG. 12 is a diagrammatic view of a carburetor metering valve embodied in this invention illustrating the operation while the engine is running at a maximum regulated speed.

FIG. 13 is a diagrammatic view of a carburetor metering valve embodied in this invention illustrating the operation while the engine is running at its idling speed.

FIG. 14 is a sectional side view of a typical carburetor utilized in conjunction with this invention showing the fuel chamber, main supply jet and discharge tube together with the air intake, venturi and throttle valve, illustrating particularly one method of restricting the area of the supply jet.

Figure 1:
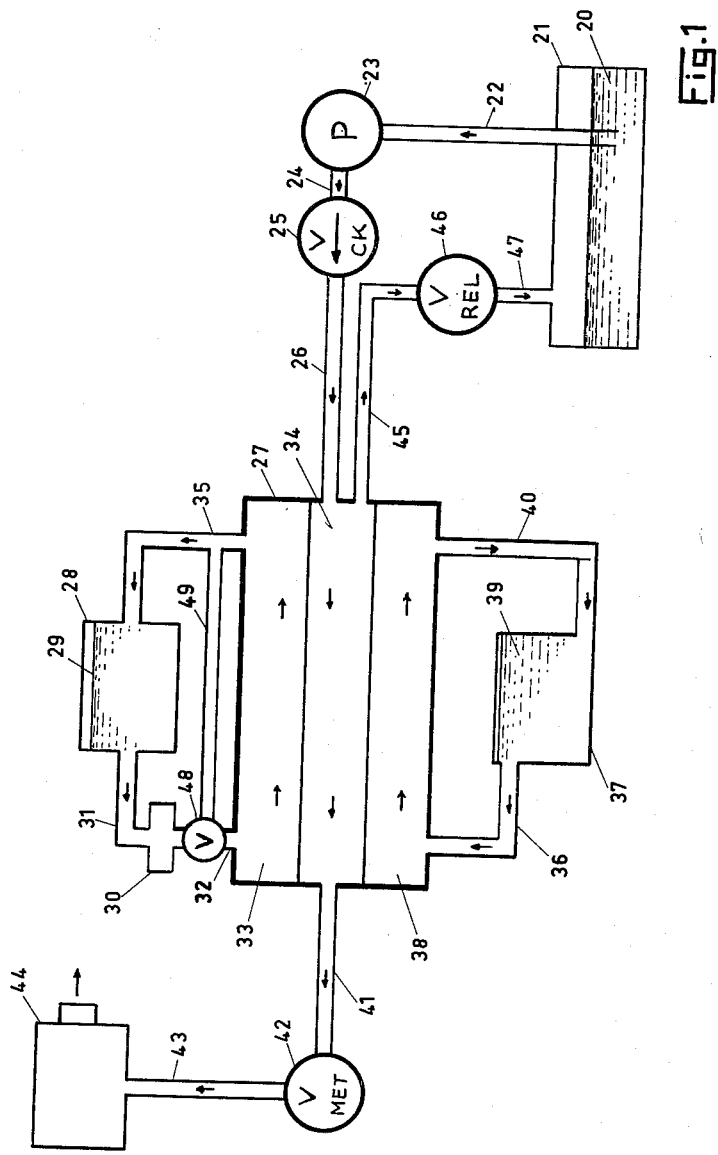
FIG. 1 is a schematic diagram illustrating the relationship between the various components of the invention and the relationship between these and a conventional engine, with which this invention is adapted to be utilized.

Referring to FIG. 1 the direction and flow of the various fluids in the fuel economizer system comprising this invention is indicated by arrows, the various components utilized in this invention comprising a fuel tank 21 connected through a pipe 22 to a fuel pump 23 adapted to draw fuel 20 from tank 21 and supply fuel 20 under pressure through a pipe 24, a check valve 25 and a pipe 26 to a heat exchange unit 27.

An oil reservoir 28 is adapted to supply oil 29 to the various bearings 30 of the conventional engine through pipe 31. Oil 29 is there heated up by bearing friction, hot oil being passed from engine bearings 30 through pipe 32 to a chamber 33 of heat exchange unit 27, chamber 33 being surrounded by a chamber 34 containing fuel 20, giving off excess heat to fuel 20, oil 29 thereafter passing through a pipe 35 back to oil reservoir 28.

A pipe 36 is connected to the hottest portion of the engine block coolant system 37, pipe 36 being at its other end connected to a second chamber 38 of heat exchange unit 27, chamber 38 being surrounded by chamber 34 containing fuel 20, heat from coolant 39 being permitted to be transferred to fuel 20 thereby further heating fuel 20 up, coolant 39 thereafter being returned through pipe 40 to a cold portion of the coolant system.

Fuel 20 is permitted to expand and be heated to a temperature substantially in the vicinity of vaporising temperature of the fuel, vapour being formed in a portion of the chamber 34, thereby providing a compressible vapour cushion above fluid 20 adapted to act as a compensating expansion chamber to compensate for variations in pressure within chamber 34 during operation of the fuel economizing system. Fuel temperature at exit end of chamber 34 is through regulating means adapted to be maintained at slightly lower temperature than vaporising temperature thereof at atmospheric pressure, fuel 20 being adapted to pass through a tube 41 connected at one end to chamber 34, the other end of tube 41 being connected to a metering valve 42 adapted to automatically meter the fuel 20 to a tube 43 that connects outlet of metering valve 42 to a carburetor 44.

A pipe 45 adjacent the fuel inlet pipe 26 allows fuel 20 at heat exchange unit pressure to be in constant communication with a relief valve 46. Fuel 20 is allowed to return to tank 21 through a pipe 47 when the pressure within the heat exchange unit 27 rises above a pre-determined figure to which relief valve 46 is set.

Referring to FIGS. 2, 3 and 4, heat exchange unit 27 comprises a cylindrical body 50, one end of which is sealed by an end disc 51, the opposite end being sealed by a disc 52. An oil tube 53, having two opposite ends 54 and 55 adapted to fit into two recesses 56 and 57 in end discs 51 and 52 respectively, is contained within the upper half of heat exchange unit 27 oil tube 53 being located axially parallel with heat exchange unit 27. The recessed joints between tube ends 54 and 55 and end discs 51 and 52 respectively are fluid tight. End discs 51 and 52 are drilled and tapped throughout, coaxially with oil tube 53 to accommodate externally threaded, screwed adapters 58 and 59 respectively.

A coolant tube 60, located parallel to oil tube 53, is contained within the lower half of heat exchange unit 27, end discs 51 and 52 being bored throughout coaxially with tube 60, allowing opposite ends 61 and 62 of tube 60 to protrude beyond end discs 51 and 52 respectively and being sealed at the locations of the protrusions therethrough. Fuel inlet pipe 26 enters heat exchange unit 27 through disc 52 at a location substantially half way up and to one side of centre of end disc 52 as shown in FIG. 4, the joint between pipe 26 and disc 52 being sealed fluid-tight.

Inside the cylindrical body 50 and substantially throughout the internal length thereof, pipe 26 spirally envelops coolant tube 60 and terminates in a discharge nozzle 63 which is substantially coaxial with axis of heat exchange unit 27, the direction of discharge of nozzle 63 being directed towards end disc 52.

The fuel outlet pipe 41 enters the heat exchange unit 27 through end disc 51 at a point substantially half way up and to one side of centre of the end disc 51, as shown in FIG. 3, the joint between pipe 41 and disc 51 being sealed fluid-tight. Pipe 41 spirally envelops the oil tube 53 substantially throughout the internal length of cylindrical body 50, terminating in an inlet nozzle 64. Inlet nozzle 64 faces end disc 51 and is in substantially axial alignment with discharge nozzle 63 of inlet pipe 26.

Cylindrical body 50 is drilled and tapped throughout its thickness vertically radially in its uppermost surface to accommodate a screw threaded bleed plug 65, while a drain plug 66 is fitted to the lowest point of cylindrical body 50.

End disc 52 is drilled throughout at a location substantially half way up as shown in FIG. 4, to accommodate pipe 45 in a fluid-tight joint, pipe 45 being in unrestricted communication with the interior of cylindrical body 50.

Figure 5:
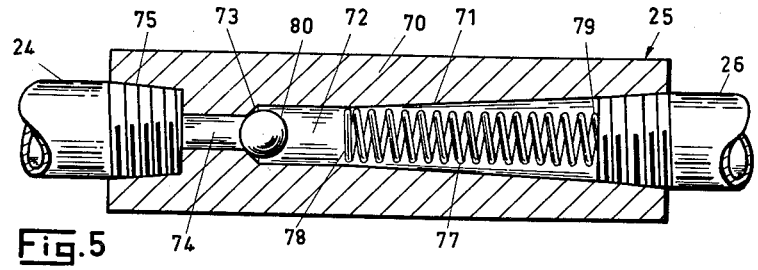
FIG. 5 is a sectional, mid-vertical side elevation of a fuel supply check valve embodied in this invention.

Referring to FIG. 5, fuel supply check valve 25 comprises a cylindrical body 70 drilled axially throughout its length forming a passage 71 which tapers in from one end of cylindrical body 70 to a position approximately half way therethrough. Passage 71 continues for a short distance as a parallel-sided cylindrical chamber 72 ending in a valve seat 73, the central portion of which is connected through an axial drilling 74 to a female thread 75 located in the end of body 70 opposite to the end containing portion of passage 71. Female thread 75 is adapted to mate with the male threaded end of fuel pipe 26. (See FIG. 1). The tapered portion of passage 71 is tapped in from the adjacent end of valve 25 to form a female thread 76 of a sufficient length and size to threadedly accommodate the male threaded end of fuel pipe 24. A helically coiled spring 77 of somewhat larger diameter than chamber 72, and having two ends 78 and 79, is housed under compression within the tapered portion of passage 71. End 78 is prevented from further outwards movement by the smaller diameter of chamber 72 while end 79 is restrained from further outward travel by fuel pipe 24. A ball valve 80, adapted to seat on valve seat 73, is freely housed within chamber 72.

Figure 6:
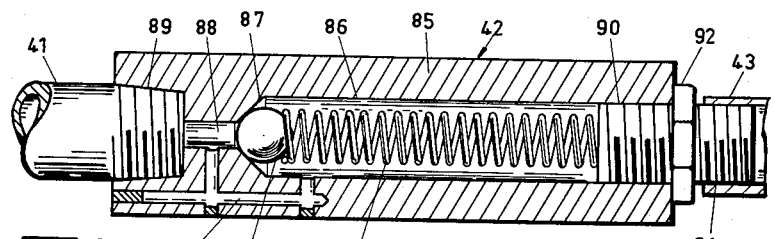
FIG. 6 is a sectional mid-vertical side elevation of a carburetor metering valve embodied in this invention.

Referring to FIG. 6, metering valve 42 comprises a cylindrical body 85 drilled axially for a substantial part of its length to form a chamber 86 which terminates in a valve seat 87. The central portion of valve seat 87 is connected through an axial drilling 88 to a female thread 89 formed in the end of body 85 opposite chamber 86, the outer end of chamber 86 being tapped to form a parallel, female thread 90, adapted to receive a screwed adapter 91 in combination with a locknut 92. Pipe 41 (ref. FIG. 1) is threadedly attached to cylindrical body 85 in conjunction with female thread 89 while adapter 91 is utilized to attach metering valve 42 to pipe 43. A bypass passage 93 is drilled in cylindrical body 85 permanently interconnecting drilling 88 with chamber 86. A ball valve 94 of a somewhat lesser diameter than chamber 86 is located within chamber 86 and retained on valve seat 87 by a helically coiled spring 95 compressibly retained within chamber 86 by ball valve 94 at the one end and a shoulder within adapter 91 at the opposite end. The pressure at which ball 94 is held on seat 87 may be varied by screwing adapter 91 in or out of cylindrical body 85 thus increasing or decreasing the compression of spring 95. Adapter 91 having been set, locknut 92 may then be tightened against the end of cylindrical body 85, preventing further rotation of adapter 91.

Figure 7:
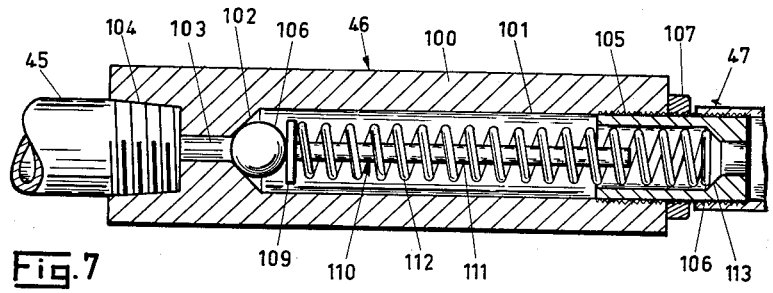
FIG. 7 is a sectional mid-vertical side elevation of a pressure relief valve embodied in this invention.

In FIG. 7, pressure relief valve 46 comprises a cylindrical body 100 drilled axially for a substantial part of its length to form a chamber 101 terminating in a valve seat 102. A drilling 103 of lesser diameter than chamber 101 continues axially through the centre portion of valve seat 102 to communicate with a female thread 104, adapted to receive the threaded end of pipe 45 (ref. FIG. 1). At the opposite end of cylindrical body 100 a parallel female thread 105 is tapped in the wall of chamber 101 adapted to receive a screwed adapter 106 in conjunction with its locknut 107. Adapter 106 is threadedly attached to pipe 47 (ref. FIG. 1).

A ball valve 108 is contained within chamber 101 and retained on valve seat 102 by an end plate 109 situated on a guide pin assembly 110, comprising a shaft 111 attached to end plate 109 extending centrally thereof, and at right angles thereto, towards the adapter 106 end of chamber 101. End plate 109 is circular, having a diameter less than the diameter of chamber 101 and greater than that of ball valve 108. A helically coiled spring 112 is compressively retained within chamber 101, its outside diameter being smaller than that of end plate 109 while its inside diameter is substantially larger than the diameter of shaft 111. Spring 112 surrounds shaft 111, exerting axial pressure on end plate 109 at one end and on a shoulder 113, within adapter 106, at its opposite end. The pressure with which ball valve 108 is retained on its seat 102 is determined by the amount of compression in spring 112. This compression in spring 112 may be varied by screwing adapter 106 in or out of cylindrical body 100, screwing adapter 106 in to increase the pressure and out to decrease the pressure, a predetermined position of the adapter 106 being permanently set by locking adapter 106 in position, utilizing locknut 107, this being screwed tight against the end wall of cylindrical body 100 and preventing further rotation of adapter 106. Adapter 106 is bored axially throughout, its internal diameter being greater than the diameter of shaft 111.

Figure 8:
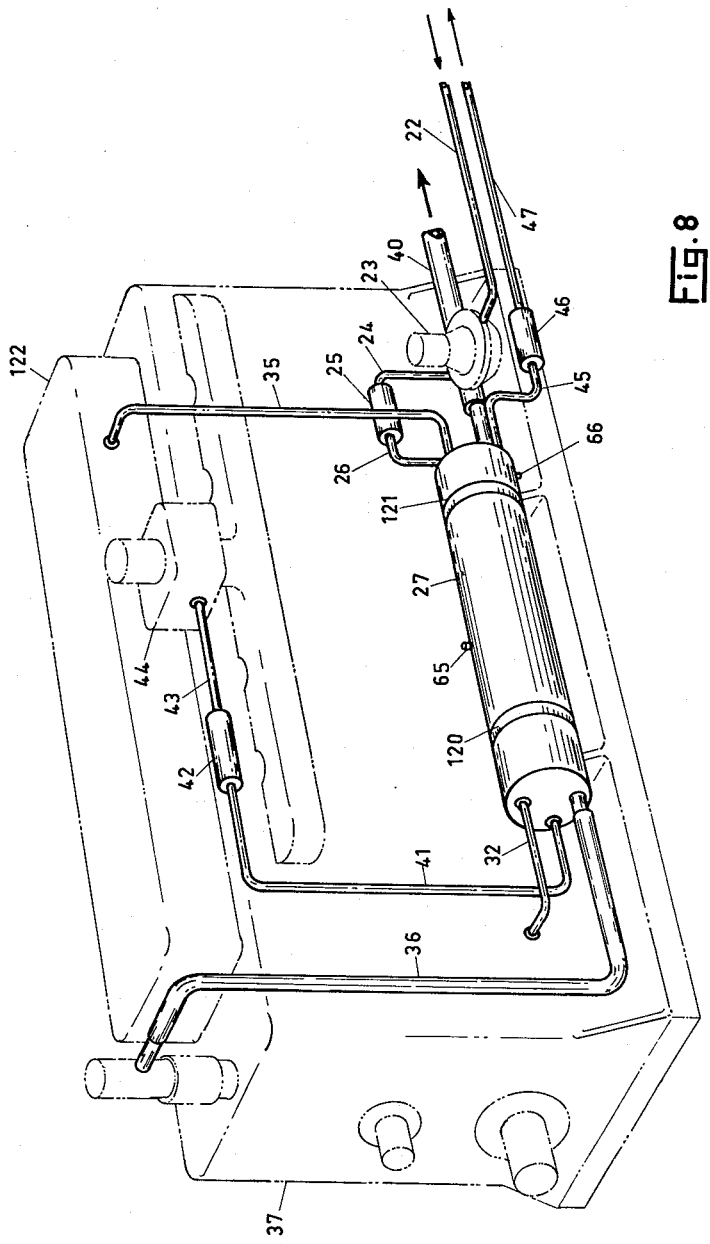
FIG. 8 is a perspective view of a fuel economizer embodying this invention, shown located on a conventional engine.

FIG. 8 illustrates one form of embodiment of the invention as described under FIG. 1 in which the heat exchange unit 27 is retained by two clamps 120 and 121 to block 37. All piping is substantially the same as shown in FIG. 1, oil reservoir 28, in this instance takes the form of the engine sump. Engine bearings 30 together with the oil pressure supply pipe 31, being contained within block 37. Oil, which has been cooled through heat exchange unit 27, is returned to the system through pipe 35 and in this instance is utilized to provide additional lubrication to the valve operating mechanism 122 of block 37.

In FIGS. 9, 10, 11, 12 and 13 the metering valve 42 is shown in diagrammatic form, attached to a fuel chamber 115 of carburetor 44. Fuel 20 is shown throughout the system, its level in fuel chamber 115 being controlled by a float mechanism indicated generally by arrow 116 comprising a float 117, a fixed pivot 118, an operating beam 119 pivotably attached to fixed pivot 118 and rigidly attached to float 117 at the one end and pivotably attached to a plate valve 120 at its opposite end. Plate valve 120 is of a greater diameter than the bore of supply line 43 and float mechanism 116 is so designed that upward movement of float 117 is directly translated into downward travel of plate valve 120 through beam 119 and pivot 118, to provide that, at a predetermined level, plate valve 120 prevents the entry of fuel from pipe 43 into fuel chamber 115. The remainder of the metering mechanism is as illustrated and described in FIG. 6.

Referring to FIG. 14, the carburetor 44 is shown in cross section having a fuel chamber 115, from the bottom edge of which a discharge tube 125 projects upwardly and outwardly. Fuel from chamber 115 flows into discharge tube 125 through a calibrated jet 126. A pin 127, of a diameter substantially smaller than the internal diameter of jet 126, passes longitudinally through jet 126, and terminates in a hooked end portion 128 located within chamber 115, thereby substantially reducing the metered fuel supply to the engine, the reasons for this being that the heating, pressurizing and mixing of the fuel, utilizing the present invention, give better carburation, due to greater atomization and improved diffusion of gasoline in the airstream through the carburetor. The improvement in the fuel/air mixture gives a more even flame rate and far more complete combustion within the cylinder. Because of this improvement in combustion, it is possible to reduce the fuel/air ratio without the undesirable detonation which would normally accompany a weaker mixture. Discharge tube 125 projects into the bore of an air intake barrel 129, the upper end of tube 125 being truncated in a line substantially parallel with the axis of barrel 129. A standard type throttle valve 130 is pivotably fitted within barrel 129 upstream of discharge tube 125 and a venturi restriction 131 is fitted circumferentially in barrel 129 in such a position that the throat 132 of venturi 131 is radially opposite the upper end of discharge tube 125.

The method of utilizing a fuel economizer embodying this invention is as follows:

Fuel from tank 21 is supplied under pressure from pump 23 through check valve 25 to the heat exchange unit 27. Heat exchange unit 27 makes use of both oil and coolant system waste heat, by having both of these fluids ducted therethrough by means of tubes 53 and 60 respectively. To bring the fuel temperature up gradually, fuel supply line 26 is wound spirally around the hot coolant tube 60, the circulation of the hot coolant being such that the fuel is affected by the coolant outlet temperature first, progressively increasing in temperature until, at the time it reaches coolant inlet temperature, the fuel is discharged into the cylindrical body 50. On initial operation of the unit, air is vented by the manual operation of the vent plug 65, to prevent the formation of a potentially explosive gasoline/air mixture. Upon cylinder 50 becoming filled with fuel, the fuel temperature will increase through contact with hot water and oil tubes thereby increasing the pressure of the fuel, causing a flow of fuel through the spiral outlet tube 41. Outlet tube 41 being in close contact with oil tube 53, the fuel contained therein progressively absorbs heat due to the fact that the point of emergence of the fuel through end disc 51 is adjacent to the oil inlet to the heat exchange unit 27, which is the hottest point of oil tube 53. Inlet nozzle 64 to outlet tube 41 is adapted to alleviate pressure surge between the heat exchange unit 27 and the carburetor metering valve 42.

The temperature within the heat exchange unit 27 combined with the jet effect of the discharge nozzle 63 from fuel inlet tube 26 causes a certain amount of vaporization to occur. This vapour cushion acts as a pressure accumulator and smoothes out any violent pressure fluctuations which may tend to occur within the heat exchange unit 27.

The fuel supply check valve 25 is fitted primarily to prevent the high pressures and temperatures generated within the heat exchange unit 27 being communicated to the fuel pump 23, either of which may cause mechanical failures and vapour locks. To this end, the check valve 25 is made of a heat insulation material such as nylon.

The operation of check valve 25 may be explained with the aid of FIGS. 1 and 5. Initially, fuel 20 under pressure from pump 23 enters valve 25 through pipe 24 causing valve 80 to move off its seat 73 into chamber 72, allowing fuel in a restricted quantity to flow through passage 71 into pipe 26. Upon ball 80 encountering spring 77, pressure from pump 23 continues to build up, compressing the spring 77, allowing ball 80 to move towards the wider end of tapered passage 71 and thereby increasing the annular area between ball 80 and the walls of passage 71 thus allowing a greater volumetric flow of fuel into pipe 26. There is also a slight speed decrease and pressure increase in the fuel, due to the reverse venturi effect of the tapered portion of passage 71. Upon pressure in the heat exchange unit 27 reaching fuel pump pressure, fuel flow stops, ball 80 under pressure from spring 77 returns within chamber 72 towards seat 73 and further pressure build up in heat exchange unit 27 causes ball 80 to return to its seat 73. The position of valve thereafter depends on the fuel demand from the engine, the particular advantage in this valve being that during the low demand periods such as idling, ball valve 80 is within chamber 72 and is not biased by spring pressure, thereby eliminating the "chatter" which usually accompanies spring-loaded valves during low pressure differential periods. The tapered portion of passage 71 also provides a chamber wherein relatively cold fuel from the pump 23 absorbs heat from the heat exchange unit 27, especially during low demand periods, and is able to make its initial expansion and pressure build up prior to entering the body 50 of heat exchange unit 27.

Excessive pressure build up in heat exchange unit 27 is prevented by pressure relief valve 46. Pressure line 45 in end disc 52 is so situated that liquid fuel and not vapour is ducted to the relief valve 46. Referring to FIG. 7, fuel under pressure from heat exchange unit 27 enters through pipe 45 and at a predetermined pressure causes ball valve 103 to move off valve seat 102, overcoming the pressure exerted by spring 112 through end plate 109. Fuel thus released passes through chamber 101 and adapter 106 into the return line to the fuel tank 47. The relieving pressure may be adjusted by the adapter 106, screwing it in to the cylindrical body 100 to increase the pressure and out to decrease. Locknut 107 ensures that there is no pressure deviation, once adapter 106 is adjusted correctly. Guide pin assembly 110 is fitted to prevent spring 112, which is long and relatively light, from bending sideways from its longitudinal axis. Shaft 111 is substantially smaller diameter than bore of adapter 106 to prevent any blocking thereof.

Carburetor 44, being of conventional design, is equipped with a float and valve mechanism 116 for controlling the fuel level within the carburetor fuel chamber 115. An engine, before incorporation of this invention, requires sufficient fuel flow to the carburetor to ensure an adequate supply for maximum demand, the result of this being that at all other times, under more normal conditions, there is far more fuel supplied than is required, the float mechanism thereby constantly moving the control valve on and off its seat in its effort to regulate the fuel supply to the engine requirements. Furthermore, in a conventional fuel system, upon shutting down quickly from a high speed to idle, kinetic energy of the fuel is sufficient to overcome the float and valve mechanism, causing flooding of the carburetor.

The action of metering valve 42 in overcoming these difficulties upon incorporation of this invention in a conventional engine is described and illustrated by FIGS. 6 and 9–13 inclusive.

FIG. 9 illustrates the carburetor condition upon the engine running at a constant speed. From the heat exchange unit 27 hot fuel emerges through the fuel outlet pipe 41 and enters the carburetor metering valve 42. Ball valve 94 moves off its seat 87, allowing fuel to pass through chamber 86 and pipe 43 into carburetor 44. Upon fuel level in carburetor 44 having been determined by the engine demand, the valve 120 closes, creating back pressure in chamber 86, this back pressure assisted by spring 95 causing ball 94 to move toward its seat 87. Pressure build up in line 41 is communicated to the interior of heat exchange unit 27, most of this pressure being absorbed by the vapour cushion within heat exchange unit 27 as previously described, and, if sufficiently high, the excess pressure is relieved through valve 46.

Upon the engine being shut down quickly, the fuel level in fuel chamber 115 will rise causing the float mechanism 116 to cut off the fuel supply. This causes a pressure build up within chamber 86 which, assisted by spring 95 causes ball valve 94 to seat upon seating 87 thus cutting out the main pressure supply of fuel to carburetor 44. However, sufficient fuel for idling purposes is supplied through by-pass passage 93. This is further illustrated in FIG. 13.

FIG. 11 illustrates the conditions prevalent in the carburetor upon the engine running at maximum speed. It may be noted that ball valve 94 is sufficiently far off its seat 87 to permit passage of sufficient fuel for this maximum demand. With reference to FIGS. 6 and 12, adapter 91 may be screwed into cylindrical body 85 thus increasing pressure on spring 95. Under these conditions ball valve 94 cannot open fully for maximum demand. Engine speed being dependent on the amount of fuel supplied, the engine to which this invention is fitted may have its maximum speed regulated by regulation of compression of spring 95 by means of rotation of adapter 91.

As shown in FIG. 13, fuel demand, during idling periods, is low, spring 95, biasing ball valve 94 towards seat 87, thereby closing main flow of fuel therethrough. By-pass passage 93 is calibrated to provide sufficient fuel for all engine idle conditions, and due to the nature of the fuel after its heating and pressurizing in heat exchange unit 27, the combustion qualities being greatly enhanced, passage 93 is required to supply far less fuel than would be necessary with an engine not fitted with this invention.

The supply of hot fuel to the carburetor to an engine fitted with this invention has additional advantages over the non-fitted engine. The carburetor of the non-fitted engine, through its proximity to the engine, becomes hot while the engine is running. Cold fuel, being supplied direct to the float chamber, gains a certain amount of heat from the surrounding casting, expands and floods the carburetor. This is especially true upon the engine being stopped, a float chamber filled with cold fuel at the correct level being subjected to greater heat as the fuel during passage through carburetor acts as a coolant. The fuel, therefore, expands upon stoppage of flow and causes excessive flooding of the carburetor.

An engine having this invention fitted, however, has at all times a supply of hot, expanded fuel in the carburetor at a temperature comparable to engine running temperature, wherefore little, if any, further expansion takes place within the float chamber, thus eliminating this particular reason for carburetor flooding.

The improvement in combustion as explained previously ensures that the fuel charge is burned as fully as possible within the cylinder, an absolute minimum of combustible residue being passed into the exhaust system. As a result, the exhaust system is much more free of carbon deposits, operates at a lower temperature, consequently suffering less internal deterioration than normal in conventional engines not filled with this invention.

The same conditions apply within the cylnder. The complete combustion of the fuel charge, combined with the fact that each fuel charge contains less gasoline, reduces the amount of free carbon remaining in the cylinder after combustion, thus cutting down considerably on the amount of carbon entering the oil system due to carbon deposits on the cylinder walls. As a result, the oil remains cleaner than normal for a longer period, and its lubricating properties are retained.

Another advantage of this invention lies in the fact that the high volatility of the mixture within the cylinder and the improved diffusion of gasoline molecules within the fuel charge causes an ionizing condition in the mixture resulting in less resistance to the spark at the spark plug this resulting in less electrical back pressure build up at the ignition points whereby oxidization of the ignition points is reduced.

An added refinement for use during extreme heat conditions, illustrated in FIG. 1, lies in the addition of a three-way valve 48 to oil pressure pipe 32. A by-pass pipe 49 connects three-way valve 48 with oil return pipe 35. Hot oil 29 from bearings 30 may now selectively be directed either through the heat exchange unit 27 entirely or through pipe 49 entirely or through both in proportion, at the will of the operator or by automatic thermostatic control means. During conditions where overheating of the heat exchange unit may result, oil may be by-passed manually or automatically through pipe 49 to return pipe 35, thus cutting out the oil heat stage within heat exchange unit 27 and maintaining the fuel at an efficient operating temperature.

In conditions where only a portion of the oil is required to heat the heat exchanger unit 27 up to maximum operating temperature a part-way position of the three-way valve 48 will restrict the flow of hot oil through heat exchange unit 27, returning superfluous oil through by-pass pipe 49 to engine sump.

It will be understood that changes in the general design of this invention may be made while still adhering to the general spirit and principle herein laid out without prejudicing the novelty thereof.

The embodiments of the invention in which we claim exclusive privilege and priority are as follows:

1. A fuel economizer for internal combustion engines comprising a heat exchanger unit of substantially elongated configuration, oil pipe means located longitudinally within said heat exchanger unit, said oil pipe means having an inlet end and an outlet end, said oil pipe inlet end protruding sealably through a left hand end of said heat exchanger unit, pipe means connecting said oil pipe inlet end with a primary connection point on the lubrication oil return line of said engine, said return line leading from the bearings of said engine to the oil sump of said engine, said oil pipe outlet end protruding sealably through a right hand end of said heat exchanger, pipe means connecting said outlet end of said oil pump means to a secondary connection point on said lubrication oil return line, said secondary connection point being located between said primary connection point and said sump, coolant pipe means located longitudinally within said heat exchanger unit, said coolant pipe means having a coolant pipe inlet end and a coolant pipe outlet end, said coolant pipe inlet end protruding sealably through said left hand end of said heat exchanger unit, coolant hose means connecting said coolant pipe inlet end with hot portion of coolant system of said engine, said coolant pipe outlet end protruding sealably through said right hand end of said heat exchanger unit, hose means connecting said coolant pipe outlet end to cool portion of coolant system of said engine, a hollow fuel inlet line located internally of said heat exchanger, said fuel inlet line being helically coiled around said coolant pipe means and in close contact with said coolant pipe means, substantially for the internal length of said heat exchanger, inlet end of said inlet fuel line protruding sealably through said right hand end of said heat exchanger, the opposite internal end of said inlet fuel line terminating substantially toward said left hand end of said heat exchanger, said terminating end of said inlet fuel line being open, placing internal portion of said inlet fuel line in contact with internal chamber of said heat exchanger, a fuel supply check valve, containing an inlet port and an outlet port, having said outlet port connected to said inlet end of said inlet fuel line by fuel pipe means, a fuel pump having a suction port and a discharge port, said inlet port being connected to said discharge port by connecting pipe means, said suction port being connected to fuel located in the fuel tank of said engine by fuel suction line means, relief valve means having a relief valve inlet port and a relief valve outlet port, said relief valve inlet port being connected to said internal chamber of said heat exchanger by connection pipe means, said relief valve outlet port being connected to said fuel tank by fuel return pipe means, a hollow fuel outlet line located within said heat exchanger, said fuel outlet line having an outlet end protruding sealably through said left hand end of said heat exchanger, said fuel outlet line being spiralled helically around said oil pipe means and in intimate contact with said oil pipe means for substantially the total length of said oil pipe means, internally of said heat exchanger, the opposite end of said helically spiralled fuel outlet line terminating substantially toward said right hand end of said heat exchanger, said terminating end being open and placing internal portion of said hollow outlet fuel line in contact with said internal chamber of said heat exchanger, a metering valve having a metering valve inlet port and a metering valve outlet port, said metering valve inlet port being connected to said outlet end of said outlet fuel line by connection pipe means, said metering valve outlet port being connected to the needle valve fuel inlet port of the float chamber of the carburetor of said engine by connection pipe means.

2. A fuel economizer for internal combustion engines as claimed in claim 1 in which a metering valve is inserted on said lubrication oil return line between said primary connection point and said secondary connection point.

3. A fuel economizer for internal combustion engines as claimed in claim 1 in which a three-way valve is located in said primary connection point, said three way valve having one inlet port and two outlet ports, said inlet port of said three-way valve being connected to pressurized portion of said lubrication oil return line, leading away from said oil sump, one of said two outlet ports of said three-way valve being connected to said inlet end of said oil pipe means, the other outlet port of said three-way valve being connected to downstream portion of said lubrication oil return line, leading toward said secondary connection point and said sump.

4. A fuel economizer for internal combustion engines as claimed in claim 1 in which said opposite internal end of said fuel inlet line is supplied with a nozzle partially restricting the free flow through said opposite internal end, said nozzle being situated substantially centrally of said heat exchanger, said nozzle being directed substantially parallel with said oil pipe means towards said right hand end of said heat exchanger, said opposite end of said fuel outlet being supplied with a nozzle situated substantially centrally of said heat exchanger, said nozzle of said fuel outlet line being directed substantially parallel with said oil pipe means towards said left hand side of said heat exchanger, bleed screw means located in the uppermost portion of said heat exchanger unit, and drain plug means located in the lowest portion of said heat exchanger.

5. A fuel economizer for internal combustion engines as claimed in claim 1 in which said fuel supply check valve comprises a longitudinal housing, bored axially therethrough from said inlet port to said outlet port, said bore being truncated for a portion thereof, said truncated bore having its largest diameter at said inlet port, the smallest diameter of said truncated portion being located substantially centrally of the longitudinal length of said check valve housing, said bore extending as a parallel sided bore from said smallest diameter away from said truncated portion for a distance larger than said smallest diameter, said parallel sided bore terminating in a valve seat formed by the further extending portion of said bore being of a diameter substantially smaller than the diameter of said parallel sided bore, said further extending bore continuing toward and until said outlet port, ball valve means located within said parallel sided bore, said ball valve means being of smaller diameter than said parallel sided bore, and compression spring means located within said truncated portion of said bore, the end of said compression spring means, that is located toward said smallest diameter end of said truncated portion, having a diameter larger than diameter of said parallel sided bore.

6. A fuel economizer for internal combustion engines as claimed in claim 1 in which said metering valve comprises a metering valve housing having a drilling through the entire length thereof, said drilling extending as a main drilling from said metering valve inlet port, for the major portion of the length of said metering valve, toward said metering valve outlet port, whereafter the diameter of said drilling is reduced to a substantially smaller diameter for the entire rest portion of said drilling, until said drilling reaches said metering valve outlet port, a compression spring located within said main drilling, a ball located between said compression spring and said reduced portion of said drilling, said ball being biased towards said reduced diameter drilling by said compression spring, said metering valve inlet port being supplied with compression spring adjustment means adapted to permit controllable adjustment of tension of said compression spring, and by-pass passageway means of substantially small diameter, connecting said reduced diameter drilling with said main drilling, said metering valve housing being made of a material having a high resistance to heat transfer.

7. A fuel economizer for internal combustion engines as claimed in claim 1 in which said relief valve means comprises a relief valve housing, said relief valve housing containing a bore connecting said relief valve inlet port with said relief valve outlet port, said bore comprising a main bore extending from said relief valve inlet port substantially toward said relief valve outlet port, the remaining portion, from said main bore to said relief valve outlet port, being of a substantially smaller diameter than said main bore, compression spring means located within said main bore, guide pin means located within said compression spring means, said guide pin means having a head of larger diameter than internal diameter of said spring means, a ball located between said smaller diameter bore and said spring means, said head of said guide pin being located between said ball and said spring means, said head of said guide pin and the outer diameter of said compression spring being substantially smaller than the diameter of said main bore, said relief valve outlet port being supplied with compression spring adjustment means adapted to controllably adjust tension in said compression spring means, said compression spring means being adapted to bias said ball towards said small diameter bore.

8. A fuel economizer for internal combustion engines as claimed in claim 1 in which the fuel jets of said carburetor of said engine are supplied with restriction means, comprising a wire inserted into the bore of each of said jets, said wire having a hook at the end thereof that is located at the up stream end of said jet, said hook being wider than said bore of said jet, said wire being of a diameter substantially smaller than the diameter of said bore of said jet.

9. A fuel economizer for internal combustion engines as claimed in claim 1 in which a three-way valve is located in said primary connection point, said three-way valve having one inlet port and two outlet ports, said inlet port of said three-way valve being connected to pressurized portion of said lubrication oil return line leading away from said oil sump, one of said two outlet ports of said three-way valve being connected to said inlet end of said oil pipe means, the other outlet port of said three-way valve being connected to downstream portion of said lubrication oil return line leading toward said secondary connection point and said sump, said three-way valve being automatically actuated by heat of said lubrication oil and said coolant, through thermostatic control means.

No references cited.